US012593755B2

(12) United States Patent
Peterson et al.

(10) Patent No.: US 12,593,755 B2
(45) Date of Patent: Apr. 7, 2026

(54) AGRICULTURAL BALER WITH REMOTE BALE LENGTH CONTROL

(71) Applicant: CNH Industrial America LLC, New Holland, PA (US)

(72) Inventors: Charles B. Peterson, West Grove, PA (US); Rory G. Chisholm, Denver, PA (US); Derek J. Friesen, Crystal City (CA); Sean D. Chevalier, Clearwater (CA)

(73) Assignee: CNH Industrial America LLC, New Holland, PA (US)

( * ) Notice: Subject to any disclaimer, the term of this patent is extended or adjusted under 35 U.S.C. 154(b) by 195 days.

(21) Appl. No.: 18/205,120

(22) Filed: Jun. 2, 2023

(65) Prior Publication Data

US 2023/0389480 A1 Dec. 7, 2023

Related U.S. Application Data

(60) Provisional application No. 63/349,779, filed on Jun. 7, 2022.

(51) Int. Cl.
*A01F 15/08* (2006.01)
*A01F 15/14* (2006.01)
(52) U.S. Cl.
CPC ........ *A01F 15/0825* (2013.01); *A01F 15/145* (2013.01)
(58) Field of Classification Search
CPC .... A01F 15/08; A01F 15/0825; A01F 15/145; A01F 15/148; A01F 15/0841
See application file for complete search history.

(56) References Cited

U.S. PATENT DOCUMENTS 7,707,932 B1 5/2010 Hoover et al.
10,127,491 B2 11/2018 Hamilton et al.
(Continued)

FOREIGN PATENT DOCUMENTS

EP 0573342 A1 * 12/1993 ......... A01F 15/0858
EP 3001894 A1 4/2016
(Continued)

OTHER PUBLICATIONS

Machine translation of EP-0573342 A1—6 pages—retrieved in 2025 (Year: 2025).*
(Continued)

*Primary Examiner* — Jimmy T Nguyen
(74) *Attorney, Agent, or Firm* — Buchanan Ingersoll & Rooney PC

(57) ABSTRACT

An agricultural baler includes a main bale chamber; a bale length sensor that is configured to determine a length of the bale as the bale is being formed in the main bale chamber and output a bale length signal representative of the bale length; a knotter that is configured to wrap and tie twine around the bale in the main bale chamber; and a controller that is configured to output a knotter cycle initiation signal to the knotter when the length of the bale, as determined in the controller by the bale length signal, reaches a pre-determined bale length threshold value, and wherein the knotter cycle initiation signal actuates the knotter to wrap and tie twine around the bale. A remote control device, which is remote from the baler, is configured to communicate with the controller to remotely adjust the pre-determined bale length threshold value.

14 Claims, 2 Drawing Sheets

(56)                    References Cited

U.S. PATENT DOCUMENTS

Figure 1:
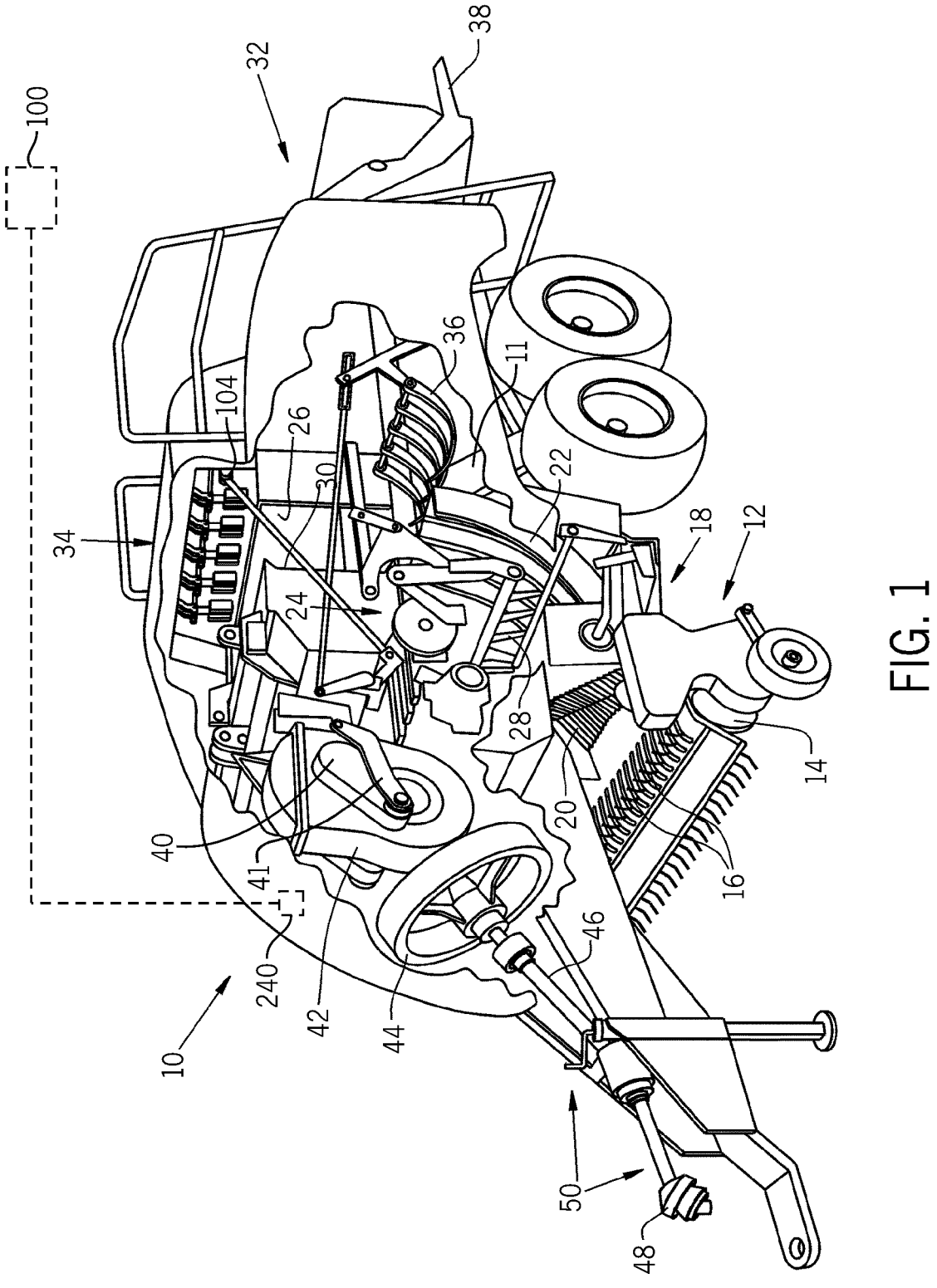

| | | | | |
|---|---|---|---|---|
| 2016/0290798 A1 * | 10/2016 | Verhaeghe | .......... | A01F 15/0825 |
| 2017/0156268 A1 * | 6/2017 | Schrag | ................ | A01F 15/0825 |
| 2018/0228091 A1 | 8/2018 | Demon | | |
| 2021/0137017 A1 * | 5/2021 | Monbaliu | ........... | A01F 15/0715 |

FOREIGN PATENT DOCUMENTS

| | | | | | |
|---|---|---|---|---|---|
| EP | 3818815 A1 | 5/2021 | | | |
| EP | 3847884 A1 | 7/2021 | | | |
| EP | 4029365 A1 * | 7/2022 | ........... | A01B 69/008 |
| WO | WO-2014187036 A1 * | 11/2014 | ............. | G08C 17/00 |
| WO | WO-2021224706 A1 * | 11/2021 | ............. | A01F 15/07 |

OTHER PUBLICATIONS

Machine translation for WO 2014187036 A1—5 pages—retrieved in 2025 (Year:2025).*
Extended European Search Report for EP Application No. 23178084.2 dated Nov. 3, 2023 (eight pages).

* cited by examiner

AGRICULTURAL BALER WITH REMOTE BALE LENGTH CONTROL

CROSS-REFERENCE TO RELATED APPLICATION

This application claims priority to U.S. Provisional Patent Application No. 63/349,779, filed Jun. 7, 2022, the content of such application being incorporated by reference herein in its entirety.

FIELD OF THE INVENTION

The present invention pertains to an agricultural baler and, more specifically, to a square baler.

BACKGROUND OF THE INVENTION

As is described in U.S. Patent App. Pub. No. 2018/0228091 and European Patent No. 3818815, which are each incorporated by reference herein in their entirety, agricultural harvesting machines, such as balers, are used to consolidate and package crop material so as to facilitate the storage and handling of the crop material for later use. In the case of hay, a mower-conditioner is typically used to cut and condition the crop material for windrow drying in the sun. In the case of straw, an agricultural combine discharges non-grain crop material from the rear of the combine defining the straw (such as wheat or oat straw) which is to be picked up by the baler. The cut crop material is typically raked and dried, and a baler, such as a large square baler or round baler, straddles the windrows and travels along the windrows to pick up the crop material and form it into bales.

On a large square baler, a pickup unit at the front of the baler gathers the cut and windrowed crop material from the ground. The pickup unit includes a pickup roll, and optionally may include other components such as side shields, stub augers, wind guard, etc.

A packer unit is used to move the crop material from the pickup unit to a duct or pre-compression chamber. The packer unit forms a wad of crop within the pre-compression chamber, which is then transferred to a main bale chamber. (For purposes of discussion, the charge of crop material within the pre-compression chamber will be termed a "wad", and the charge of crop material after being compressed within the main bale chamber will be termed a "flake"). Typically such a packer unit includes packer tines or forks to move the crop material from the pickup unit into the pre-compression chamber. Instead of a packer unit it is also known to use a rotor cutter unit, which chops the crop material into smaller pieces.

A stuffer unit transfers the wad of crop material in charges from the pre-compression chamber to the main bale chamber. Typically such a stuffer unit includes stuffer forks which are used to move the wad of crop material from the pre-compression chamber to the main bale chamber, in sequence with the reciprocating action of a plunger within the main bale chamber.

In the main bale chamber, the plunger compresses the wad of crop material into flakes to form a bale and, at the same time, gradually advances the bale toward the outlet of the bale chamber. The plunger reciprocates, back and forth, toward and away from the discharge end of the baler. When enough flakes have been added and the bale reaches a full (or other predetermined) size, a number of knotters are actuated which wrap and tie twine, cord or the like around the bale while it is still in the main bale chamber. The twine is cut and the formed baled is ejected out the back of the baler as a new bale is formed.

It would be advantageous to provide a user-controlled remote device for controlling operation of the baler.

SUMMARY OF THE INVENTION

According to one aspect, an agricultural baler includes a main bale chamber; a bale length sensor that is configured to determine a length of the bale as the bale is being formed in the main bale chamber and output a bale length signal representative of the bale length; a knotter that is configured to wrap and tie twine around the bale in the main bale chamber; and a controller that is configured to output a knotter cycle initiation signal to the knotter when the length of the bale, as determined in the controller by the bale length signal, reaches a pre-determined bale length threshold value, and wherein the knotter cycle initiation signal actuates the knotter to wrap and tie twine around the bale. A remote control device, which is remote from the baler, is configured to communicate with the controller to remotely adjust the pre-determined bale length threshold value.

BRIEF DESCRIPTION OF THE DRAWING FIGURES

Figure 2:
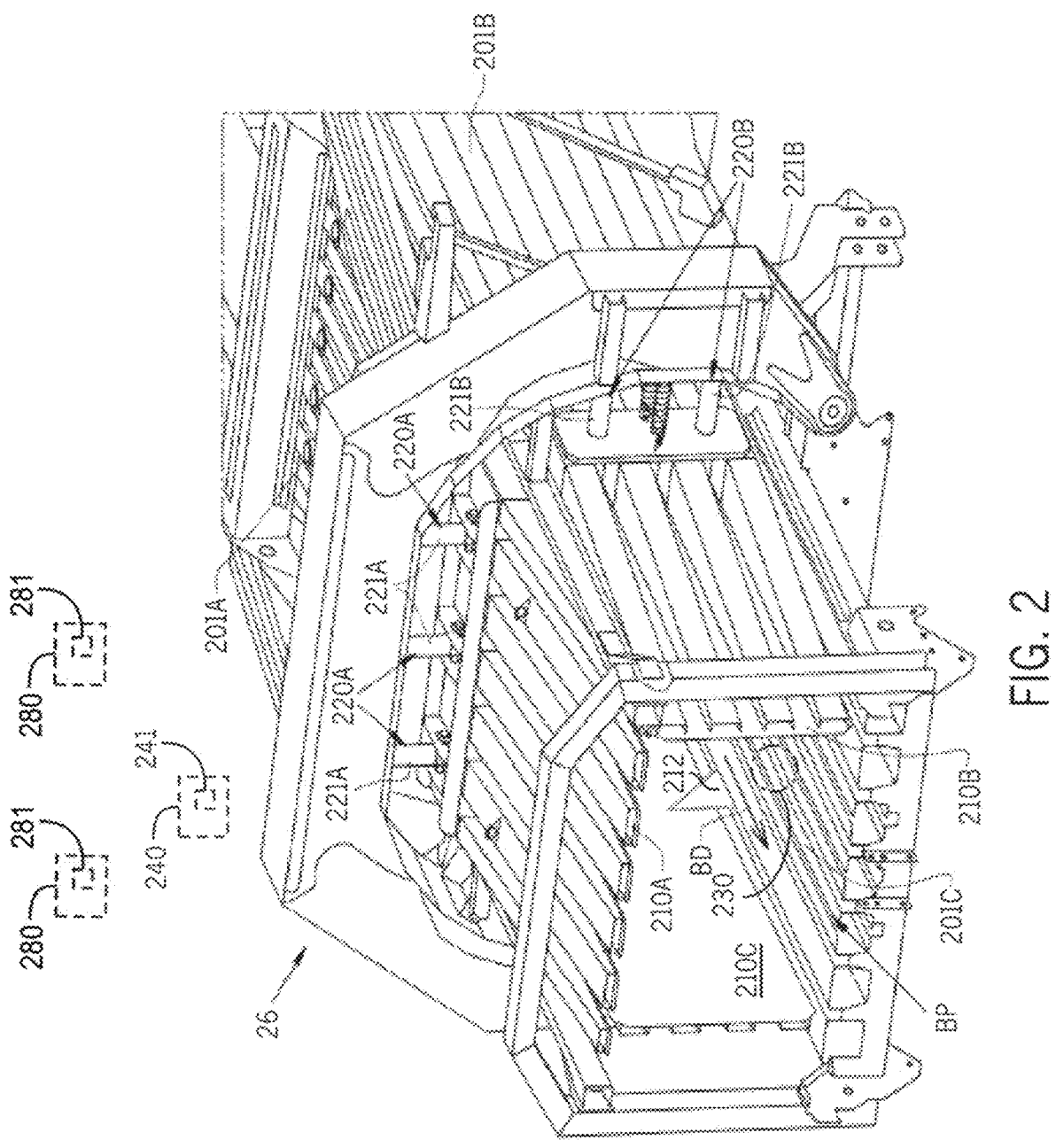

FIG. 1 is a perspective cutaway view showing the internal workings of a large square baler, and a remote device that is operatively connected to a controller of the baler; and FIG. 2 is a perspective rear view of a baling chamber of the baler of FIG. 1.

DETAILED DESCRIPTION OF THE INVENTION

Referring to the drawings, and more particularly to FIG. 1, there is shown a perspective cutaway view showing the internal workings of a large square baler 10 including a chassis 11. The baler 10 operates on a two-stage feeding system. Crop material is lifted from windrows into the baler 10 using a pickup unit 12. The pickup unit 12 includes a rotating pickup roll 14 with tines 16 which move the crop rearward toward a packer unit 18 and/or a rotor unit. An optional pair of stub augers (one of which is shown, but not numbered) are positioned above the pickup roll 14 to move the crop material laterally inward. The packer unit 18 includes packer tines 20, which push the crop into a pre-compression chamber 22 to form a wad of crop material. The packer tines 20 intertwine the crop together and pack the crop within the pre-compression chamber 22. The pre-compression chamber 22 and the packer tines 20 function as the first stage for crop compression. Once the pressure in the pre-compression chamber 22 reaches a predetermined sensed value, a stuffer unit 24 moves the wad of crop from the pre-compression chamber 22 to a bale chamber 26, which is carried by the chassis 11 and may also be referred to as a "main bale chamber." The stuffer unit 24 includes stuffer forks 28 which thrust the wad of crop directly in front of a plunger 30, which reciprocates within the main bale chamber 26 and compresses the wad of crop into a flake. The stuffer forks 28 return to their original stationary state after the wad of material has been moved into the main bale chamber 26. The plunger 30 compresses the wads of crop into flakes to form a bale and, at the same time, gradually advances the bale from an inlet end 104 of the main bale chamber 26 toward an outlet 32 of the main bale chamber 26. The main bale chamber 26 and the plunger 30 function as the second stage for crop compression. When enough flakes have been added and the bale reaches a full (or other predetermined) size, knotters 34 are actuated which wrap and tie twine around the bale while it is still in the main bale chamber 26. Needles 36 bring the lower twine up to the knotters 34 and the tying process then takes place. The twine is cut, and the formed bale is ejected from a discharge chute 38 as a new bale is formed.

The plunger 30 is connected via one or two crank arms 40 (only one crank arm is shown in FIG. 1) with a gear box 42. The gear box 42 is driven by a flywheel 44, which in turn is connected via a drive shaft 46 with the power take-off (PTO) coupler 48. The PTO coupler 48 is detachably connected with the PTO spline at the rear of the traction unit, such as a tractor (not shown). The PTO coupler 48, the drive shaft 46 and the flywheel 44 together define a portion of a driveline 50, which provides rotative power to the gearbox 42. The flywheel 44 has a sufficient mass to carry the plunger 30 through a compression stroke as power is applied to the drive shaft 46 by the traction unit (not shown). The number of strokes performed by the plunger per minute is dependent on the PTO speed. In one example, the PTO shaft 13 rotates at a speed of around 1000 rpm such that the plunger 30 completes around 48 strokes per minute.

A conrod 41 connecting the crank arm 40 to the gear box 42 may be equipped with load sensors, particularly load cells that enable determination of a load force experienced by the plunger during the baling process. The load cells may, for example, be provided within the conrod bearings. Alternatively, load sensors may be provided at any other point suitable for detecting the load acting on the plunger during the various phases of the stroke. The load force is typically highest when the plunger 30 engages with the crop in the bale chamber 26.

Referring now to FIG. 2, a perspective view of the bale chamber 26 is illustrated. The bale chamber 26 generally includes a plurality of stationary walls, which may include a top wall 201A, a pair of opposed side walls 201B, and a stationary bottom wall 201C opposite the top wall 201A. As the bale flows through the bale chamber 26 in a bale forming direction, which is designated by arrow BD, the bale encounters movable density doors 210A, 210B, 210C. In some embodiments, the movable density door 210A is a top density door that is pivotally coupled to a stationary part of the baling chamber 26 so as to form the top wall 201A and the movable density doors 210B and 210C are a pair of side density doors that are each pivotally coupled to a stationary part of the baling chamber 26 so as to form respective side walls 201B. A bale pressing area BP is defined between the density doors 210A, 210B, 210C and the stationary bottom wall 201C where the density doors 210A, 210B, 210C exert a pressure on a bale. The pressure exerted on the bale by the density doors 210A, 210B, 210C holds the bale in place as the plunger 30 compresses the wads of crop into flakes. A greater pressure exerted on the bale by the density doors 210A, 210B, 210C, therefore, results in a more densely packed bale that exits the bale chamber 26.

To adjust the size of the bale pressing area BP, and thus the pressure exerted on the bale by the density doors 210A, 210B, 210C, at least one actuator, e.g. at least one fluid cylinder 220A, 220B, is provided to move the density doors 210A, 210B, 210C. In the illustrated embodiment, the top density door 210A is moved by three fluid cylinders 220A and each of the side density doors 210B, 210C is moved by two fluid cylinders 220B. Each of the fluid cylinders 220A, 220B includes a cylinder rod 221A, 221B that is configured to move one of the density doors 210A, 210B, 210C, as will be described further herein. In some embodiments, the fluid cylinders 220A, 220B are hydraulically powered cylinders supplied with, for example, pressurized oil to extend and retract the cylinder rods 221A, 221B. It should be appreciated that the fluid cylinders 220A, 220B may be powered by fluids other than oil, such as other incompressible fluids, in accordance with the present disclosure.

When the fluid cylinders 220A, 220B are extended, the respective density doors 210A, 210B, 210C are pivoted towards each other to reduce the size of the bale pressing area BP. This movement of the density doors towards each other may also be referred to as "closing" the density doors. When the fluid cylinders 220A, 220B are retracted, the respective density doors 210A, 210B, 210C are pivoted away from each other to increase the size of the bale pressing area BP. This movement of the density doors away from each other may also be referred to as "opening" the density doors.

A bale length sensor is provided in the bale chamber 26 to continuously or intermittently determine the length of the bale being formed in the bale chamber 26. The bale length sensor is illustrated as a star wheel 212, extending through the bottom wall 201C of the bale chamber 26. It should be appreciated that while the star wheel 212 is illustrated as extending through the bottom wall 201C of the bale chamber 26, the star wheel 212 may extend through any of the walls 201A, 201B, 201C. Only a single sprocket of the star wheel 212 is shown in the bale chamber 26 of FIG. 2. As the bale is pushed through the bale chamber 26, the bale engages the sprockets of the star wheel 212 and thus moves the sprockets of the star wheel 212 in the baling direction BD. Movement of the sprockets causes a rotation of the star wheel 212 that is directly proportional to an extension (e.g. the length) of the bale within the baling chamber.

In known balers, the length of the formed bale is controlled by activation of the knotters. Activation of the knotters is typically set in one of two ways: 1) by mechanical adjustment of one or more components of the knotters; and/or 2) by digital adjustment via selections on a display of the baler. Both adjustments require a user to be in close physical proximity to the baler in order to adjust when the knotters activate, which controls the length of the formed bale.

To address some of the previously described issues with known balers, and referring still to FIGS. 1 and 2, the bale length sensor comprise the star wheel 212 and an associated encoder 230 that outputs rotation signals corresponding to rotation of the star wheel 212. A controller 240 may be operably coupled to the encoder 230 and the knotters 34. The controller 240 is configured to determine a length of a bale forming in the bale chamber 26 based on received rotation signals from the encoder 230 and output a knotter cycle initiation signal to the knotters 34 when the length of the bale is a defined bale length so the knotters 34 begin the knotter cycle and tie the formed bale. The knotters 34 are thus digitally controlled via signals output by the controller 240. Upon outputting the knotter cycle initiation signal, the controller 240 may reset and repeat the process for a new bale forming in the bale chamber 26. The controller 240 may store the defined bale length in a memory 241 of the controller 240.

The controller 240 is further configured to receive a bale length adjustment signal from a remote device 100 and adjust the defined bale length responsively to receiving the bale length adjustment signal, e.g., by adjusting the defined bale length stored in the memory 241. As used herein, a "remote device" is any device that is not physically connected with the controller 240, e.g., by wires, cables, etc., and that is not physically carried by the baler 10. A remote device 100 may be, for example, a mobile device including a processor such as, but not limited to, a smart phone, a tablet computer, a laptop, a desktop, etc. The controller 240 may include, for example, a wireless fidelity (WiFi) module, a mobile telephony module and/or a BLUETOOTH® module that allows the remote device 100 to wirelessly connect with the remote device 100 via WiFi and/or BLUETOOTH® standards. While the element 100 is referred to as a "device," it should be appreciated that the term "remote device" also encompasses a network of connected devices. For example, the remote device 100 may be a cellular network that outputs the bale length adjustment signal to the controller 240 after being prompted to do so by one or more devices coupled to the cellular network. It should thus be appreciated that the remote device 100 may be a wide variety of devices according to the present invention.

In some embodiments, the controller 240 is configured to output one or more baler status signals to the remote device 100 that correspond to various parameters of the baler 10. For example, the controller 240 may be configured to output one or more baler status signals that correspond to the defined bale length, a current bale length, a crop moisture reading, etc. The remote device 100, upon receiving the baler status signal(s), may display pertinent information to a user via a graphical user interface, e.g., an application. The user may then make changes in the application, prompting the remote device 100 to output an adjustment signal, e.g., the bale length adjustment signal, to the controller 240. The controller 240 may also be configured to output other types of signals. For example, the controller 240 may be configured to output one or more bale length adjustment signals to other balers 280, which may have controllers 281 that are configured to only receive signals or, alternatively, that are configured to send and receive signals but may be further from the remote device 100. The controller 240 may thus act as a primary controller for a plurality of balers 280 that receives signals from the remote device 100 and then transmits reproductions of the signal(s) to other balers 280. It should be appreciated that the remote device 100 may also be the controller 281 of another baler 280 or other type of agricultural machine, e.g., a rake.

The present invention also provides a method for forming a bale. The method includes determining a bale forming in the bale chamber 26 has reached a defined bale length and activating the knotters 34 responsively to determining the bale has reached the defined bale length so the knotters 34 tie the bale. The method may be performed by the controller 240 and further include receiving the bale length adjustment signal from the remote device 100, adjusting the defined bale length to be an adjusted bale length, determining a bale forming in the bale chamber 26 has reached the adjusted bale length, and activating the knotters 34 responsively to determining the bale has reached the adjusted bale length so the knotters 34 tie the bale.

It should be appreciated that while the baler 10 is illustrated and described as being what is commonly referred to as a "large square baler," the present invention also provides a small square baler that includes knotters and a bale length sensor (such as a star wheel and/or an encoder) extending into a bale chamber along with the previously described controller 240 and the encoder 230. An exemplary small square baler is described in U.S. Pat. No. 7,707,932, which is incorporated in its entirety herein by reference.

From the foregoing, it should be appreciated that the baler 10 provided according to the present invention has a controller 240 that can adjust the bale length of bales produced by the baler 10 after receiving a bale length adjustment signal from the remote device 100. The controller 240 thus enables a user to remotely control the baler 10 in a manner that is convenient and easy for the user.

It is to be understood that the above-described operating steps are performed by the controller 240 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 240 described herein, such as the aforementioned method of operation, is implemented in software code or instructions which are tangibly stored on the tangible computer readable medium. Upon loading and executing such software code or instructions by the controller 240, the controller 240 may perform any of the functionality of the controller 240 described herein, including any steps of the aforementioned method described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed:

1. An agricultural baler comprising:

a main bale chamber in which crop material is compressed into bales, the main bale chamber comprising an inlet for receiving a wad of crop material from a pre-compression chamber of the agricultural baler, and an outlet for discharge of compressed crop material into a bale;

a bale length sensor that is configured to (i) determine a length of the bale as the bale is being formed in the main bale chamber and (ii) output a bale length signal that is representative of the bale length;

a knotter that is configured to wrap and tie twine around the bale in the main bale chamber;

a controller that is configured to output a knotter cycle initiation signal to the knotter when the length of the bale, as determined by the controller as a function of the bale length signal, reaches a pre-determined bale length threshold value, and wherein the knotter cycle initiation signal actuates the knotter to wrap and tie twine around the bale; and a remote control device, which is remote from the baler, that is configured to communicate with the controller to remotely adjust the pre-determined bale length threshold value, wherein the remote control device is a controller of another baler, wherein the controller is configured to output one or more baler status signals to the remote control device, wherein the one or more baler status signals comprise the pre-determined bale length threshold value, the bale length signal, and a crop moisture reading.

2. The agricultural baler of claim 1, wherein the bale length sensor is a rotatable 2. star-wheel that is mounted in the main bale chamber.

3. The agricultural baler of claim 2, wherein the bale length sensor further comprises a rotary encoder that is operatively coupled to the star-wheel, the rotary encoder being configured to output rotation signals to the controller corresponding to a rotation of the star-wheel.

4. The agricultural baler of claim 3, wherein the controller is configured to calculate the length of the bale based on the output rotation signals of the rotary encoder.

5. The agricultural baler of claim 1, wherein the remote control device is physically disconnected from the controller.

6. The agricultural baler of claim 1, wherein the remote control device is a mobile device including a processor.

7. The agricultural baler of claim 6, wherein the mobile device is a tablet computer, or a laptop.

8. The agricultural baler of claim 1, wherein the controller includes a wireless fidelity (WiFi) module, a mobile telephony module and/or a BLUETOOTH® module to enable communications with the remote control device.

9. The agricultural baler of claim 1, wherein the remote control device includes a cellular network that outputs a bale length adjustment signal to the controller after being prompted by one or more devices coupled to the cellular network.

10. The agricultural baler of claim 1, wherein the remote control device includes a graphical user interface that is programmed to display data relating to the baler status signals.

11. The agricultural baler of claim 1, wherein the controller is configured to output one or more bale length adjustment signals to controllers of other balers in a vicinity of the baler.

12. The agricultural baler of claim 1, further comprising a plunger that is configured for compressing the crop material within the main bale chamber.

13. An agricultural vehicle comprising the agricultural baler of claim 1.

14. The agricultural baler of claim 1 further comprising a memory for storing the pre-determined bale length threshold value such that the pre-determined bale length threshold value is employed for successive bales yielded by the agricultural baler.

* * * * *